United States Patent

Goldberg et al.

[15] 3,686,478
[45] Aug. 22, 1972

[54] ELECTRONIC BALLISTIC COMPUTER CIRCUIT

[72] Inventors: Ira I. Goldberg, Philadelphia, Pa.;
Paul M. Marasco, Cherry Hill, N.J.;
Kenneth R. Pfleger, Warminster, Pa.

[73] Assignee: The United States of America as represented by the Secretary of the Army

[22] Filed: Nov. 13, 1970

[21] Appl. No.: 89,213

[52] U.S. Cl. ......235/61.5 E, 89/41 ME, 235/150.53, 235/197, 307/229
[51] Int. Cl. ..........................G06g 7/28, G06g 7/80
[58] Field of Search....235/197, 150.53, 193, 61.5 R, 235/61.5 D, 61.5 E, 61.5 DF; 89/1.5 E, 41 R, 41 D, 41 B, 41 ME

[56] References Cited

UNITED STATES PATENTS

| | | | |
|---|---|---|---|
| 3,575,085 | 4/1971 | McAdam | 235/61.5 DF |
| 3,591,772 | 7/1971 | McAdam | 235/197 X |
| 3,551,655 | 12/1970 | Walsh | 235/197 X |
| 3,560,726 | 2/1971 | Platt | 235/197 |
| 3,560,727 | 2/1971 | Schussler | 235/197 |

*Primary Examiner*—Felix D. Gruber
*Attorney*—Harry M. Saragovitz, Edward J. Kelly, Herbert Berl and Sheldon Kanars

[57] ABSTRACT

An all electronic, tank housed, ballistics computer circuit which upon the receipt of laser BCD range signals from a laser range finder, provides electrical signals containing information which is representative of a plurality of straight line slopes and intercepts so as to electronically approximate a known ballistic function for gun positioning purposes. The received BCD signals are converted to analog ac range and dc range information. The dc range information is utilized with a reference voltage to selectively enable logic circuitry which, when so enabled, permits selected solid stage switches to pass electrically analoged slopes and intercepts developed from the analog ac range information and an ac reference voltage, respectively.

3 Claims, 4 Drawing Figures

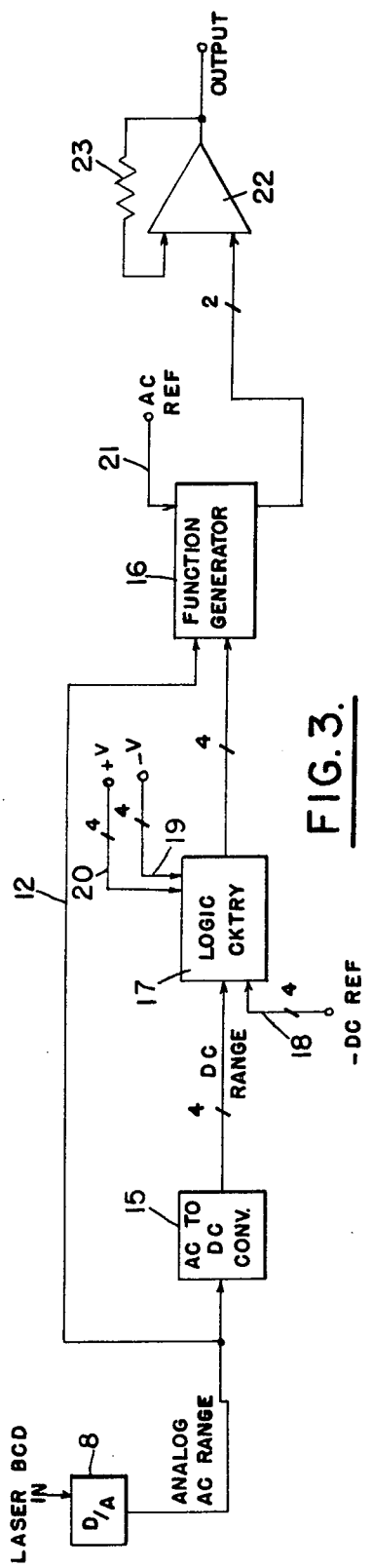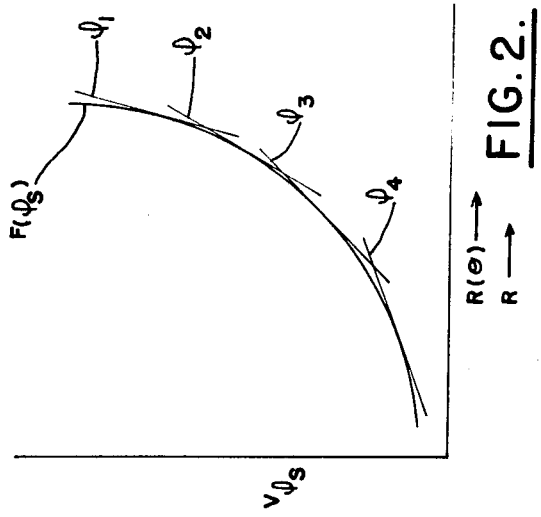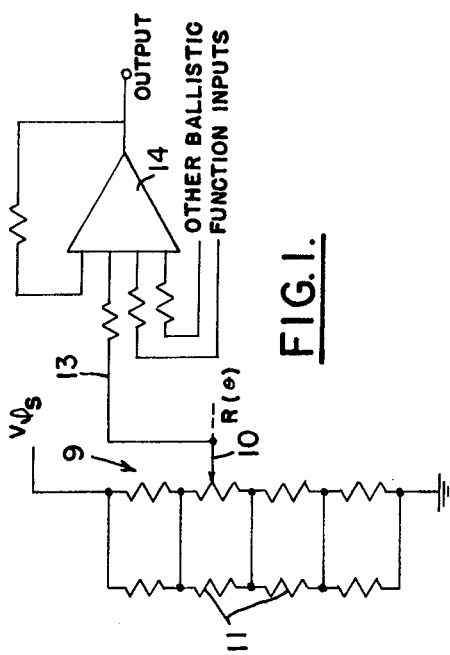

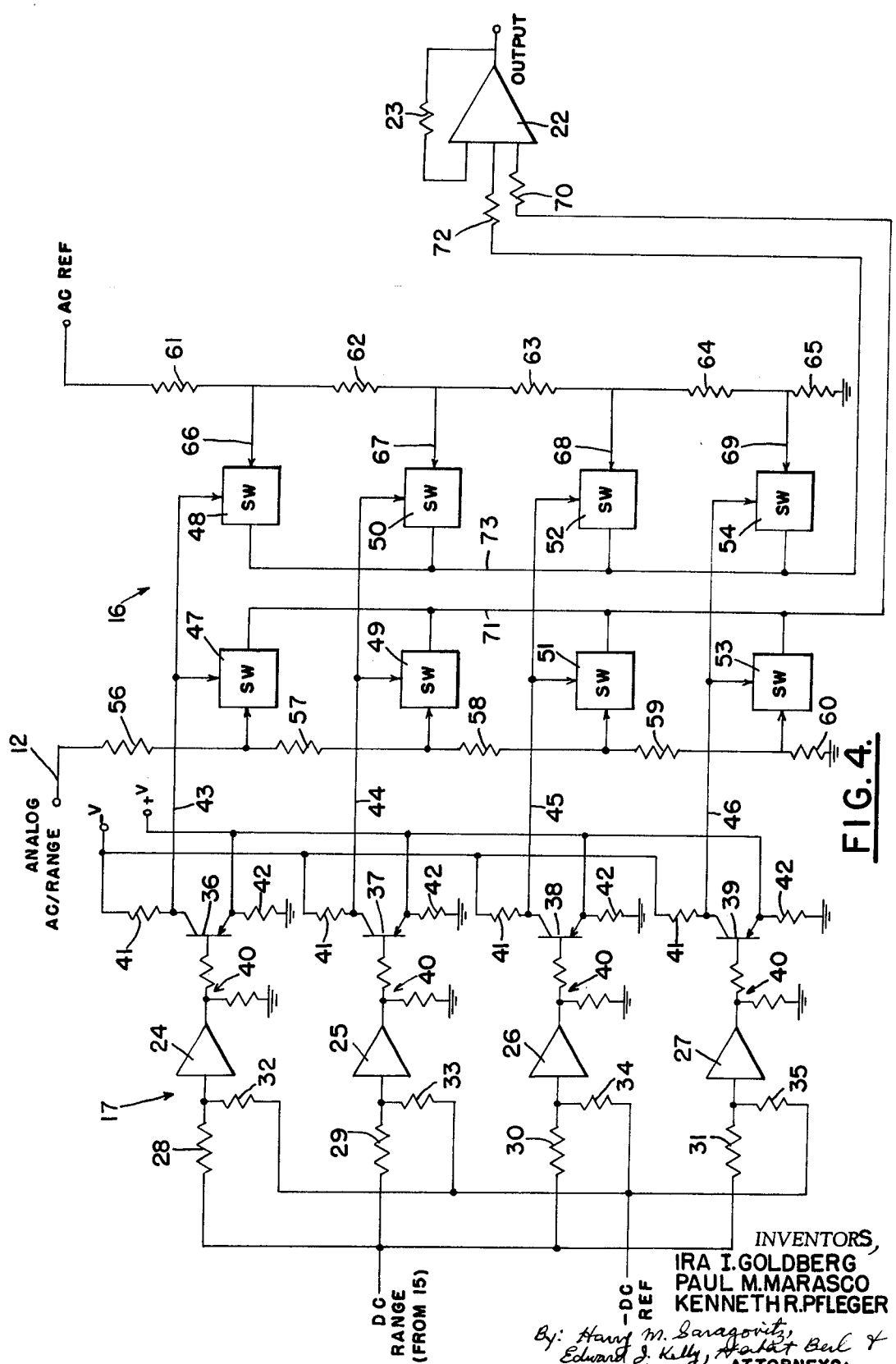

ELECTRONIC BALLISTIC COMPUTER CIRCUIT

STATEMENT OF GOVERNMENT INTEREST

The invention described herein may be manufactured, used, and licensed by or for the Government for governmental purposes without the payment to us of any royalty.

BACKGROUND OF THE INVENTION

This invention relates to an all electronic, ballistics computer circuit for combat vehicle application. More particularly, the invention relates to an electronic, solid state, computer circuit for applying ballistic and lead information to a tank or other military weapon fire control system for gun positioning purposes. The invention is housed within the tank and is relatively light, compact, and insensitive to shock and vibration. Prior art tank ballistic computer systems, as well as the present invention, may operate in conjunction with a tank-housed laser rangefinder. A laser beam is directed toward a target (fixed or moving) and the reflected beam is collected in an optical system which also electro-optically converts the laser range data into electrical binary coded decimal (BCD) pulses. The BCD signals are fed through a digital to analog converter so as to provide electrical analog range information.

In the prior art systems, this electrical analog information is fed to an electro-mechanical range conversion servo which converts the range information into an analog shaft rotation. This shaft rotation, is then utilized to mechanically position the sliders of function potentiometers in the computer, thus inserting the proper range. Servo positioning signals in elevation and azimuth are likewise generated and are transmitted to the servo motors of reticle positioning servos in the telescope or periscope.

While the aforementioned prior art computer is relatively simple, the necessary use of electro-mechanical elements extremely limits system performance. Error is frequently introduced because of wear and tear, slippage, and susceptability to shock and vibration. Also, cost and size become important factors, especially when it is considered that the usable area within a tank is severely limited. In addition, due to the nature of the electro-mechanical elements themselves, the reliability of the overall system is low. It has been shown that the mean time between failures (MTBF) of the system is only approximately 300 hours. There has therefore arisen a need for a tank ballistics computer which does not suffer from the disadvantages listed above and which is relatively inexpensive and ideally suited to microminiaturization.

It is therefore the general purpose of the invention to provide an all electronic, solid state, ballistics computer circuit which is both rugged and reliable and which, upon the receipt of laser BCD signals, entirely electrically generates gun positioning signals for one of the ballistic functions. A ballistic computer containing circuitry according to the present invention has an MTBF conservatively stated at 2,000 hours. Accuracy and performance have also been greatly enhanced. Being all electronic, size and cost have been greatly reduced. In addition microminiaturization seems applicable thereby affording a greater savings of space.

SUMMARY OF THE INVENTION

A laser rangefinder provides laser BCD pulses or signals to a digital to analog converter which, responsive thereto, provides electrical analog ac range signals or voltages. The ac range voltages are fed through precisely chosen input resistors to a bank of normally open switches. An ac reference voltage is likewise fed to a like bank of switches through a second set of precisely chosen input resistors. The ac range voltages are also converted into dc levels and as such are utilized to preselectively enable logic circuitry which connects supply control or enabling signals to the aforementioned switch banks. The laser BCD signals enable certain portions of the logic circuitry to the exclusion of other portions. Those portions that are enabled function to enable certain switch pairs in the switch banks for passage therethrough of the ac range information (after development across certain of the first set of the input resistors) and of the ac reference voltage (after development across certain of the second set of input resistors). The ac range information developed across the first set of input resistors provides the slopes while the ac reference voltage developed across the second set of input resistors provides the intercepts of straight lines utilized to fit or approximate a non-linear ballistic function. In this way, a facsimile of the ballistic function is produced.

DESCRIPTION OF THE DRAWING

FIG. 1 is a simplified illustration of a prior art system utilized to position the gun of a military weapon upon the receipt of range information and the conversion thereof into an angular shaft rotation;

FIG. 2 is a graph of a typical ballistic function;

FIG. 3 is a block diagram of the computer circuit in accordance with the present invention; and FIG. 4 is a more detailed and partially schematic diagram of certain of the elements of FIG. 3.

DESCRIPTION OF THE PREFERRED EMBODIMENT

A computer system containing circuitry according to the present invention provides continuous and simultaneous analog solutions of the total elevation correction angle and total deflection correction angle ballistic equations. These equations may be stated as:

$$E = \phi_s \cos C + \delta_T \sin C + \epsilon \qquad (1)$$
$$D = \phi_s \sin C - \delta_T \cos C + \Delta \qquad (2)$$

where, $E$ = total superelevation above the LOS (Line of Sight) (mils)

$D$ = total deflection from the LOS (mils)

$\phi_s$ = total superelevation correction in the vertical plane for the effects of gravity and differential effects such as air density, EFC (Effective Full Charge), etc. (mils)

$\delta_T$ = total horizontal correction due to ammo drift, crosswind and the effect of a moving target (mils)

$C$ = cant angle between the gun trunnion axis and the local horizontal $\epsilon$ = total elevation correction due to gun tube droop, sighting system parallax, and zeroing (mils)

$\Delta$ = total horizontal correction for the gun tube bend, sighting system parallax and zeroing (mils)

It is considered unnecessary to herein discuss the derivation of equations (1) and (2) as they are well known in the art. Many texts contain this information. See, for example, Engineering Design Handbook, Fire Control Series, Section I, AMC Pamphlet No. 706-327, January 1968, pages 2-39 through 2-44.

A ballistic computer containing circuitry according to the invention synthesizes and instruments the above equations by electrically generating facsimiles of each of the ballistic functions which comprise the terms of the equations. Since the technique can be the same for all of the ballistic functions, only one such instrumentation is herein disclosed, it being understood that like instrumentation may be employed to electronically synthesize the other ballistic functions.

Referring now to the drawing and more particularly to FIGS. 1 and 2, there is shown respectively therein a prior art system for electro-mechanically generating the superelevation ballistic function ($\phi_s$) of equations 1 and 2, and a non-linear graph depicting $\phi_s$ as a function voltage of both angular shaft rotation and range (R).

FIG. 1 includes a potentiometer 9 having a mechanically actuated slider arm 10 communicating therewith and a plurality of resistor "taps" 11, of preselected ohmic value, one each placed in parallel configuration across selected lengths of the potentiometer. The potentiometer is grounded at one end thereof and is connected at the other end to a source of alternating current herein labeled $V_{\phi_s}$. The output from the potentiometer 9 connected by slider arm 10 and a wire 13 to a summing operational amplifier 14 which also receives other ballistic function inputs. The output of amplifier 14 is connected to gun positioning mechanisms, not shown.

Referring now to FIG. 2, along with FIG. 1, it is known from experience that the superelevation ballistic function may be represented graphically be the essentially non-linear curve F ($\phi_s$) plotted with voltage as the ordinate and range (as an angle) as the abscissa. It can therefore be seen that for a particular range there corresponds thereto a particular voltage. The system of FIG. 1 utilizes this approach by providing the potentiometer 9 with resistor taps 11 of particular ohmic value to allow the slider arm 10 to pick off a voltage across a particular resistance value representative of the slope of the superelevation function for a given range to feed that voltage via the line 13 to the summing amplifier 14. Thus, in operation, when received laser BCD signals are converted to a shaft rotation by means of a digital to analog converter and a range conversion servo, as discussed heretofore, the slider 10 is moved up or down the potentiometer 9 as a function of the amount of angular rotation or range received and therefor selects a particular resistance across which a voltage drop from the supply, $V_{\phi_s}$, may be developed. This resistance is representative of the slope of F ($\phi_s$) for the particular range R ($\theta$). The unique voltage developed for this resistance may be applied to the operational amplifier 14 and would correspond to the superelevation correction for the particular range. Other ballistic function inputs, as included in the equations 1 and 2, may be supplied to the amplifier 14 by means of other, like, potentiometer setups. The resultant total correction appears at the output of amplifier 14 upon the summation of the ballistic function inputs thereby.

As discussed heretofore, this electro-mechanical approach, while relatively simplistic in form, was not too reliable due to the inherent disadvantages of an electro-mechanical system. It is apparent, for example, that vibration and shock, as experienced by a tank, could greatly cause the slider 10 to shift and to therefore produce erroneous information at the amplifier 14 output.

Referring now to FIG. 3, along with FIG. 2, the present invention will be explained. In FIG. 3, there is shown a block diagram for electronically generating a facsimile of the superelevation ballistic function F ($\phi_s$). It is to be understood, of course, that any of the ballistic functions which comprise the terms of the equations 1 and 2 may be generated in a manner analogous to that hereinafter disclosed.

Received laser BCD signals or pulses are fed to a digital to analog converter 8 which provides range data in the form of electrical analog ac range information. This analog range information is fed directly to an ac to dc convertor 15 and, via the line 12, to a function generator 16. Convertor 15 provides dc range information along a single wire and thence along four wires to logic circuitry 17, which is connected by four wires to provide switching signals to the function generator 16. Logic circuitry 17 further receives minus or negative dc reference voltage via the four lines 18 which connect at a common junction to a single line leading to the dc reference source and further receives via lines 19 and 20 negative and positive bias voltages indicated as $-V$ and $+V$. Function generator 16 further receives an ac reference voltage via the line 21 and provides at its output two signals which are an electronic facsimile of the superelevation function F ($\phi_S$) for a particular range. These signals are fed to a summing amplifier 22 having thereacross a feed back resistor 23. The amplifier 22 output is fed to reticle positioning servomechanisms in a periscopic or telescopic sight and/or to gun positioning mechanisms in the tank (not shown).

Referring now to FIG. 4, there is shown in greater detail the logic circuitry 17 and function generator 16 of FIG. 3. The logic circuitry is herein shown to comprise a plurality, here four, of operation amplifiers 24-27, inclusive. DC range information from the convertor 15 is fed to the input of each of the amplifiers 24-27 through respective resistors 28, 29, 30, and 31. Similarly, the negative dc reference voltage is fed to the same input of amplifiers 24-27 through respective resistors 32, 33, 34, and 35. Resistors 28-31, inclusive, have the same ohmic value, whereas resistors 32-35 have significantly different ohmic values for reasons to be explained hereinafter. The outputs of amplifiers 24-27 are connected respectively to PNP transistors 36-39, inclusive, through transistor biasing circuitry 40. The collectors of transistors 36-39 receive the $-V$ voltage through resistors 41. The emitters of transistors 36-39 are connected to a $+V$ voltage and to ground through resistors 42. The four outputs from the logic circuitry 17 are taken from the collectors of transistors 36-39 via the lines 43, 44, 45, and 46, respectively. Line 43 is connected to a pair of electronic solid state switches 47 and 48 of function generator 16. Similarly, each of the lines 44-46 is connected to a respective like pair of switches 49 and 50; 51 and 52; and 53 and 54. Switches 47, 49, 51 and 53 receive analog ac range information (via the line 12, as shown in FIG. 3). Placed in the line 12, are serially connected resistors 56, 57, 58, 59, and 60. Thus, the analog ac range information delivered to the switch 47 is developed across the voltage divider comprised of resistor 56 and resistors 57–60 to ground. Whereas, the analog range information delivered to the switch 49 is developed across the voltage divider comprised of resistor 56, 57 and the series resistance comprising resistors 58–60 to ground. In like manner, the range information delivered to the switches 51 and 53 is developed across voltage dividers comprising resistor 56 and series combinations of resistors 59 and 60 to ground and resistor 60 to ground respectively An ac reference voltage is developed across resistors 61–65 connected in series to ground. These resistors are connected to switches 48, 50, 52, and 54 via, respectively, the taps 66, 67, 68 and 69. The outputs of switches 47, 49, 51 and 53 are connected, via the line 71, to operational amplifier 22 through the resistor 70. Similarly, the outputs of switches 48, 50, 52, and 54 are connected, via the line 73, to amplifier 22 through resistor 72.

It should be understood that the set of resistors 56–60, although shown in a series relationship may also be arranged in a parallel relationship. In the parallel arrangement the resistance values of each resistor will be such that the effective resistance of the network will allow the required voltage levels to be passed by the switches 47, 49, 51 and 53 to the amplifier 22. Similarly, resistors 61–65 may be arranged in a parallel relationship rather than series.

Referring again to FIG. 2, it is seen that a specific function, here the superelevation function $F(\phi_s)$, can be approximated by a series of straight line slopes and intercepts. In FIG. 2, four such straight lines $\phi_1$, $\phi_2$, $\phi_3$ and $\phi_4$ are shown. It is to be understood, however, that for greater accuracy it is only necessary to fit more straight lines to the $F(\phi_s)$ curve. Since for any straight line, $\phi = AR + B$ where $A$ is the slope and $B$ is the intercept, and further since $F(\phi_s) = \phi_1 + \phi_2 + \phi_3 + \phi_4, + \ldots$, the total superelevation ballistic function may be represented by:

$$F(\phi_s) = A_1R + B_1 + A_2R + B_2 + A_3R + B_3 + A_4R + B_4 + \ldots \quad (3)$$

That is, the total superelevation ballistic function may be graphically depicted by a plurality of straight line segments. The circuitry of FIG. 4 electronically mechanizes equation (3), the various slopes being determined by resistors 56–60, inclusive, and switches 47, 49, 51, and 53 and the various intercepts being determined by resistors 61–65 and switches 48, 50, 52, and 54. This will now be described.

As stated heretofore, resistors 32–35, inclusive, have different ohmic values. These values are chosen from experience so as to be in consonance with the received laser BCD signals. By way of example, resistor 35 may be assigned a given value, for example 10K, with resistors 34, 33, and 32 having respectively, the ohmic values 20K, 30K, and 40K.

The operation of the system is as follows. As noted heretofore, range information in the form of laser BCD signals are converted into analog ac range information and further converted into dc range information (by converter 15). As shown in FIG. 4, this dc range information is fed to resistors 28–31, inclusive, all of which may be considered to have the same ohmic value. When the dc range signal is zero, the only voltage appearing at the input of respective amplifiers 24–27 is a negative one due to the negative dc reference voltage applied across respective resistors 32–35, inclusive. When a negative voltage is present at a respective amplifier input, the amplifier provides a positive output dc voltage which may, for explanation purposes, be plus 10 volts. This voltage is applied to the respective PNP transistors 36–39, inclusive, which invert the received signal to provide a negative 10 volt signal to the respective switches in the function generator 16. Switches 47–54, inclusive, may comprise any of the known, solid state electronic types as, for example, field effect transistors, which are rendered operative upon the receipt of a control signal which is positive in sense. Hence the receipt by these switches of a negative signal maintains the switches in their off or non-conductive state. Furthermore, these switches rather than being electronic, may be activated by any means which will cause a switch to open or close. These means may be, but are not limited to, electromechanical, mechanical, magnetic, hydraulic, pneumatic or fluidic.

As the dc range signals supplied to the logic circuitry are increased, a particular one of the amplifiers 24–27 will have applied thereto a slightly positive input. The presence of a positive input will cause the amplifier to provide a negative 10 volt output which will cause the transistor associated therewith to provide a positive 10 volt output. This last-mentioned positive voltage will cause the particular connected switch pair in the function generator 16 to be rendered conductive. The controlled or ac analog range information received via the line 12 and modified by voltage divider comprised of resistor 56 and a series of the resistors 57–60, inclusive, is then passed by the now conductive switch that is odd-numbered. Similarly, at the same time that this switch is rendered conductive (as for example switch 47), its companion switch (or switch 48) is likewise rendered conductive by the positive 10 volt signal with the result that switch 48 passes the ac reference signal via the ohmic drop across the voltage divider formed by resistors 61–65 as determined by the arm 66. In this way, the slope and the intercept, respectively, for one of the straight lines shown in FIG. 2 are fed to summing amplifier 22.

The particular amplifier or amplifiers which is (are) rendered operative to provide the aforementioned switching signals is determined by the ohmic values of resistors 32–35, inclusive. Thus, recalling that resistors 32–35 are assigned the values respectively of 40K, 30K, 20K, and 10K and assuming that the negative dc reference voltage applied is minus 120 volts, the following becomes apparent. The current through resistor 32 is −3 ma while the current through the remaining resistors is −4 ma for resistor 33, −6 ma for resistor 34, and −12 ma for resistor 35. Resistors 28–31 have the same ohmic value and consequently, a net zero voltage will be present at the input of the amplifiers 24–27 when the current passing through resistors 28–31 (as developed by the dc range voltage) balances out or bucks the current through the resistors 32–35.

Thus, as the dc range voltage rises from zero the amplifier 24 will have a net zero voltage at the input thereof when the current through resistor 28 is sufficient to balance out the −3 ma flowing through resistor 32. Any slighter rise in dc range voltage will render the amplifier 24 input positive to cause the amplifier 24 to provide the −10 volt output signal as aforementioned thereby eventually rendering switches 47 and 48 conductive. With respect to the amplifier 27, the dc range voltage must rise to a level such that it bucks out −12 ma.

It is thus seen that as the dc range information rises from zero to some positive level or levels as a function of the received BCD laser range signals, amplifier 24 is the first to have a net zero voltage input applied thereto, amplifier 27 the last, and amplifiers 25 and 26 are second and third, respectively. Since each of the amplifiers 24–27 provide a negative output upon the presence of just slightly greater than a zero input, it is seen that switches 47 and 48 are the first pair to switch, switches 49 and 50 are the second pair, switches 51 and 52 the third, and switches 53 and 54 are last. Thus, by realizing the switching sequence and by properly choosing the ohmic values of resistors 56–60, inclusive it becomes possible to select straight line slopes which will fit the ballistic function of FIG. 2.

Thus the slopes of $\phi_1$, $\phi_2$, $\phi_3$ and $\phi_4$ are herein determined by the voltage divider comprised of resistors 56–60. In like manner, proper positioning of the arms 66–69, inclusive, of the voltage divider comprised of resistors 61–65 permits the selection of the desired intercept.

It is to be noted that the series of discrete resistors 61–65 could quite readily be replaced by a single resistor tapped at the appropriate points.

It has thus been shown that the switch pairs 47 and 48 and the resistance associated therewith provides one of the aforementioned straight lines (for example, $\phi_4$) utilized to generate the superelevation ballistic function. The remaining switch pairs and their remaining associated resistances in conjunction with the pairs and resistors already switched may be utilized to generate the remaining straight lines. Greater accuracy could be achieved merely by connecting additional switch pairs in the manner of connection shown in FIG. 4.

The remaining ballistic functions comprising the terms of equations (1) and (2) may be instrumented in the manner analogous to that aforedescribed. All that is required is a repetition of the same circuitry for each of the functions. It is further noted, however, that by manipulation of the above equations it becomes apparent that certain of the electrical elements can be shared so as to effect a reduction and/or savings in parts.

For positioning the reticle of a periscopic or telescopic sight, and/or the tank gun, it is necessary only to sum the outputs from the various function generators, as for example, by a summing amplifier such as amplifier 22, and to feed the output thereof to reticle or gun positioning mechanisms in the tank.

We wish it to be understood that we do not desire to be limited to the exact details of construction shown and described, for obvious modifications will occur to a person skilled in the art.

We claim:

1. An electronic ballistic computer circuit for generating a ballistic function in the process of positioning the gun of a military weapon upon the receipt of range finder signals and the conversion thereof into electrical pulses, comprising:

means receiving the electrical pulses for providing ac analog voltages responsive thereto and representative thereof;

conversion means connected to said receiving means for providing dc voltages upon the receipt thereby of said ac analog voltages;

logic means connected to said conversion means for providing switch control signals upon the receipt of said dc voltages, a reference voltage, and positive and negative bias voltages;

function generating means connected to said logic means and said receiving means for providing signals representative of an electrical facsimile of a ballistic function upon the receipt of said ac analog voltages and said switch control signals;

means connected to said function generating means for providing gun positioning signals upon the receipt of said electrical facsimile signals, and means connected to said function generating means for providing an ac reference voltage thereto, and wherein said reference voltage provided to said logic means is a negative dc voltage, and said function generating means comprises:

a first plurality of switches for receiving said switch control signals;

a second plurality of switches for also receiving said switch control signals;

a first voltage divider resistor network connected to said first switch plurality and receiving said ac analog voltage for offering preselected amounts of ohmic resistance thereto to control the voltage levels supplied to each switch of said first plurality, a second voltage divider resistor network connected to said second switch plurality and receiving said ac reference voltage for offering preselected amounts of ohmic resistance thereto to control the voltage levels supplied to each switch of said second plurality, and wherein said first and second switch pluralities respectively pass selected levels of said ac analog voltages and said ac reference voltage upon the receipt of said switch control signals.

2. A function generator for providing an electrical facsimile of a ballistic function upon the receipt of ac analog range and ac reference voltages and further upon the receipt of dc range switching signals, comprising:

first and second pluralities of switches connected to receive said switching signals;

first and second voltage dividers connected respectively to said first and second switch pluralities for respectively offering preselected amounts of ohmic resistance to said analog voltages and said ac reference voltages to control the voltage levels supplied to each switch of said switch pluralities, and wherein selected switches of said first and second switch pluralities pass selected levels of said ac analog voltages and said ac reference voltages upon the receipt of said switching signals;

said first switch plurality and said second switch plurality comprise a like number of switches;

said switching signals are provided to selected pairs of switches, one each in each of said switch pluralities, whereby one or more of said switch pairs may be rendered operative to pass said ac analog voltages and said ac reference voltages to the exclusion of the remaining switches in said switch pluralities, and said first voltage divider comprises a plurality of series-connected resistors connected to receive said ac analog voltages, each of said resistors of preselected ohmic value and each connected to at least one switch of said first switch plurality.

3. A function generator for providing an electrical facsimile of a ballistic function upon the receipt of ac analog range and ac reference voltages and further upon the receipt of dc range switching signals, as described in claim 2, wherein said second voltage divider comprises:

a plurality of series-connected resistors connected to receive said ac reference voltages, each of said last mentioned resistors of preselected ohmic value and each connected to at least one switch of said second switch plurality.

* * * * *